United States Patent [19]
Howse

[11] Patent Number: 6,041,543
[45] Date of Patent: Mar. 28, 2000

[54] PEST TRAP HAVING AN ELECTROSTATICALLY CHARGED SURFACE

[75] Inventor: Philip Edwin Howse, Gosport, United Kingdom

[73] Assignee: University of Southampton, Southampton, United Kingdom

[21] Appl. No.: 08/367,271

[22] PCT Filed: Jul. 9, 1993

[86] PCT No.: PCT/GB93/01442

§ 371 Date: Jun. 9, 1995

§ 102(e) Date: Jun. 9, 1995

[87] PCT Pub. No.: WO94/00980

PCT Pub. Date: Jan. 20, 1995

[30] Foreign Application Priority Data

Jul. 14, 1992 [GB] United Kingdom .................... 9214956

[51] Int. Cl.[7] .................................................. A01M 1/20
[52] U.S. Cl. ............................................ 43/132.1; 43/121
[58] Field of Search ...................... 43/124, 132.1, 43/107, 131, 121

[56] References Cited

U.S. PATENT DOCUMENTS

| | | | |
|---|---|---|---|
| 2,340,255 | 1/1944 | Weil | 43/131 |
| 2,587,397 | 2/1952 | Smith | 43/131 |
| 2,606,391 | 8/1952 | McGrew | 43/121 |
| 3,322,623 | 5/1967 | Doakley | 43/132.1 |
| 4,030,233 | 6/1977 | Wunsche | 43/121 |
| 4,263,740 | 4/1981 | Hemsarth | 43/121 |
| 4,316,344 | 2/1982 | Carlsen | 43/121 |
| 4,438,090 | 3/1984 | Brite | 424/7.1 |
| 4,476,515 | 10/1984 | Coffee | 43/132.1 |
| 4,553,698 | 11/1985 | Parker et al. | 239/3 |
| 4,592,163 | 6/1986 | Wilson | 43/121 |
| 4,608,774 | 9/1986 | Sherman | 43/121 |
| 4,753,032 | 6/1988 | Sherman | 43/131 |
| 4,805,341 | 2/1989 | Maeda | 43/132.1 |
| 4,872,282 | 10/1989 | Caldwell | 43/121 |
| 5,050,338 | 9/1991 | Doakley et al. | 43/132.1 |
| 5,090,153 | 2/1992 | Mullen | 43/121 |
| 5,148,627 | 9/1992 | Thomas | 43/132.1 |
| 5,182,879 | 2/1993 | Hopkins | 43/131 |

OTHER PUBLICATIONS

Patent Abstracts of Japan, vol. 5, No. 144 (C–71) Sep. 11, 1981.

*Primary Examiner*—Kurt Rowan
*Attorney, Agent, or Firm*—Fish & Richardson P.C.

[57] ABSTRACT

Pest control wherein at least part of a pest is exposed to particles which carry an electrostatic charge, preferably of opposite polarity to that of the surface of the pest, and which may be sticky or tacky and comprise a wax, for example, a plant wax, such as, Carnauba wax, or an inorganic material, such as, talc. A pesticide, such as, a chemical or microbial insecticide, or a behavior modifying chemical may be associated with the particles which may also be dispensed in and/or dispersed via a liquid or gaseous carrier, possibly from a pressurized gas or aerosol dispenser at whose nozzle the particles are charged electrostatically by friction. In a preferred embodiment, a trap with a lure (45, 53) has a surface (34), preferably sloping, coated with the particles for destabilizing pests and a trapping zone (41, 43) into which destabilized pests fall from the particle-coated surface (34) and are retained for subsequent disposal.

23 Claims, 5 Drawing Sheets

PEST TRAP HAVING AN ELECTROSTATICALLY CHARGED SURFACE

DESCRIPTION

The present invention relates to pest control by trapping and/or killing and is especially, but not exclusively, related to the control of flying or crawling insects and the like.

The most common domestic insect pests are houseflies, mosquitoes and cockroaches.

The common housefly, *Musca domestica*, occurs throughout the world in domestic situations. Along with similar species, such as, the lesser housefly, blowflies and flesh flies, it contaminates food and spreads diseases, such as, typhoid and cholera, and also carries the eggs of parasitic worms.

The housefly is also a problem on refuse tips and is becoming a progressively greater nuisance in agriculture, where it breeds in deep litter breeding units for poultry and other animals.

The cockroach is ubiquitous in urban situations in the tropics and sub-tropics and is common in heated buildings in Britain, the rest of Europe and North America where food is prepared. Large cockroach populations are found in sewers and drains and many disease organisms have been isolated from them.

The mosquito is both a severe nuisance pest and vastly important as a vector for blood-borne diseases, such as, malaria, yellow fever, dengue and the like.

Control of those insect pests is becoming more urgent as human populations increase and provide more resources for them to breed.

Insecticide use inevitably encourages the evolution of resistance. In Britain, as in many other countries, prolonged attempts to control houseflies in animal rearing systems have led to the increasing incidence of flies which are resistant to the major insecticides in common use. These insects can spread into private houses. For instance, there was national concern recently over the discovery of pyrethroid-resistant houseflies in households in southern Hampshire and as a result, sales of sticky fly-papers rocketed.

Control of insects in areas where food is prepared depends upon scrupulous hygienic procedures, periodic fumigation with insecticides and/or the use of traps.

There is increasing public pressure throughout Europe for the development of environmentally-acceptable pest control measures in which synthetic insecticides are not used. The present invention provides a unique opportunity to meet that concern.

Commercially-available insect traps divide into three basic types:

1) "sticky traps", such as, fly-papers or cardboard "box" or "delta" type traps (for cockroaches and others) with sticky inserts;
2) "no-exit traps", such as the Victorian-style fly trap which is dome-shaped with a funnel-shaped entrance therebelow through which insects can enter; and
3) "electric grid traps" which usually have a light emitting near-UV light for attracting insects on to a high voltage grid. These insects are killed by electrocution. Variants on this model include the so-called "roach-buster" trap for cockroaches and a fly trap using a low-voltage grid to dislodge flies on to a sticky surface.

In particular, some traps for flying or crawling insects use conventionally an attractant, for example, a light source or chemical attractant, and a device which either provides a barrier to prevent the escape of the insects or dislodges the insects on to an adhesive surface from which the insects cannot escape. An example is the traditional bell-shaped fly trap whose base has a narrow central upwardly projecting tubular opening and whose bottom contains a liquid attractant, such as, a fermenting solution. Insects fly up the tubular opening into the trap and cannot escape, eventually falling into the liquid and drowning. This trap is inefficient, because it has a small entrance. Whilst it finds applications, in a modified form known as a McPhail trap, in agriculture against fruit flies, it is not suitable for domestic use because of its large size, unsightly appearance and unpleasant decomposition products.

More common for indoor applications than the simple mechanical traps is the use of chemical insecticides or high voltage devices. There are many versions of the high voltage trap for flying insects in which an intense blue light attractant is arranged behind a metal grid across which a high voltage is applied. Insects attracted to the light fly into the grid where they are severely burned. These electric traps suffer from the disadvantages of noise and odour from burning insects.

A high voltage trap for crawling insects, namely, the so-called "roach-buster" trap, is shown, for example, in European Patent No. 0024402, in which an attractant is used to lure crawling insects, such as, cockroaches, on to an inclined surface which has a metal grid pulsed at intervals with a voltage sufficient only to dislodge the insect on to a sticky or tacky surface on the inner floor of the base of the trap.

Also, in published British Patent Application Nos. 2132917 and 2119678 in the name of National Research Development Corporation and in European Patent Application Nos. 243031, 193348, 118202 and 110524 and British Patent Application No. 058472 in the name of Imperial Chemical Industries PLC, various methods are disclosed for improving the effectiveness of liquid insecticide sprays by electrically charging droplets of liquid as they are dispensed from a spray nozzle.

Generally, sticky traps are unsightly and retain few insects, whilst no-exit traps are inefficient, bulky and unsightly, as they must be transparent so that insects try to escape towards the light. Electrical grid traps usually require a mains power source and they must be made electrically safe. They are often ineffective against houseflies and tend not to be used in animal rearing sheds. They are expensive to manufacture and require regular servicing.

It is an object of the present invention to provide a pest trap, as well as an associated method, which overcomes, or at least substantially reduces, the disadvantages associated with known traps, as discussed above.

One aspect of the present invention, therefore, provides a method of controlling pests, such as, insects, by trapping and/or killing them, in which at least part of a pest is exposed to particles carrying an electrostatic charge.

Preferably, the electrostatic charge carried by the particles is of opposite polarity to that of the pest, possibly that on the surface of the pest.

Another aspect of the present invention provides a trap for use in the method of the invention defined above. More specifically, there is provided an inventive trap for controlling pests, such as insects, comprising means arranged to expose at least part of a pest to particles carrying an electrostatic charge.

Again, the electrostatic charge carried by the particles is preferably of opposite polarity to that of the pest, usually that of the surface thereof.

The particles are preferably fine and of such a size that they are able to adhere to the surface of the pest by at least electrostatic attraction for as long as possible.

Insects adhere to smooth or inclined surfaces using adhesive organs on their feet. These adhesive organs are pads covered with numerous fine hairs with flattened tips. An oily substance is secreted on to the tips of the hairs and surface molecular forces ensure adhesion of the hairs to the surface on which the insect is standing.

It is observed that as the feet of an insect become covered in particles, the insect loses its ability to adhere to a smooth, and particularly an inclined, surface. The particles also interfere with the insect's sense organs, which may cause the insect to groom more frequently. In the case of flying insects, it is known that the flight reflex is inhibited by contact of the feet with any substrate. Accumulation of particles on the insect's feet tends to inhibit both the flight and adhesion of the insect which is, thus, more likely to fall from an inclined surface. A flying insect, having landed on a suitably-coated and inclined surface, is thus unlikely to fly away and simply slides down the surface.

It is known that an insect carries an electrostatic charge. In the case of the cockroach, the outside of its cuticle is positively charged, with an electrostatic gradient across the cuticle (Beament, J. W. L. in *Nature Lond.* Vol. 191, 1961, pp217–221).

Adhesion of the particles to, say, the cuticle of the insect, or indeed any other part of the surface of the insect or other pest, may be further improved if the particles are sticky or tacky.

In a preferred method of controlling insects, the particles which carry an electrostatic charge of opposite polarity to that of the surface of an insect to be trapped and/or killed, are attracted to the insect by electrostatic forces and adhere to the insect's cuticle. Particles also adhere to the insect's feet, which causes any insect to become destabilised and to lose its grip on a surface on which it stands. The insect may then fall into a trapping zone which may include a fluid, a powder, a desiccant, a chemical toxicant or an adhesively sticky or tacky surface or any combination thereof for retaining the insect therein.

The immobilised and trapped insect may be left to die or it may be removed for destruction or study. The insect is not necessarily killed whilst held in the trapping zone and the inventive method may be used for monitoring purposes, as well as for other means of pest control.

In another preferred method of controlling insects or other pests by killing according to the present invention, the particles include a pesticide, such as, an insecticide, which may be a chemical or microbial insecticide. Suitable microbial insecticides include entomopathogenic viruses, bacteria and fungi. Chemicals having sub-lethal effects, such as, monoterpenes or sesquiterpenes may be associated with the particles, such chemicals being known to accelerate an insect's loss of co-ordination. Behaviour modifying chemicals may also be used.

In one embodiment of this method, the trapping zone may be eliminated. In another embodiment, the particles may be dispensed in and/or dispersed via a liquid or gaseous carrier. In this case, it is to be appreciated that the electrostatically-charged particles to which a pest is exposed in accordance with the inventive method, are of a solid particulate nature but that they may be enveloped in a liquid droplet carrier when, say, they are dispensed from a nozzle as a spray or plume. Such a liquid carrier may be polar or non-polar, depending upon the nature of the particles themselves, and should be selected to volatilise before or after exposure of a pest to the particles. The former is preferred because the pest is then exposed to the charged particles per se, rather than particles enveloped in a droplet of liquid which volatilises subsequent to contact with the pest. However, the latter may be preferred when the liquid or gaseous carrier is also the carrier for any pesticide or sub-lethal or behaviour modifying chemical associated with the particles.

Charging of the particles may be achieved by friction or by subjecting them to electrical discharge, high electrical fields or other suitable means. Frictional charging of the particles in the case of traps may take place during manufacture, during assembly, prior to operation and/or during operation. Where the particles are applied directly to the pest, for instance, by a dispenser, such as, an aerosol spray dispenser, frictional charging may be effected by suitable design or the dispenser, particularly the nozzle configuration thereof.

Crawling insects may be induced to walk through the particles and flying insects may be induced to pass through a zone of moving particles and/or may settle on an inclined or sloping surface coated with the particles. Particles may be used as a spray or curtain to adhere insecticide to insects in the field if there is no need to trap the insects.

Suitable particles may be of wax which readily accumulates an electrostatic charge. A plant wax, such as, Carnauba wax, is particularly preferred. However, particles of any other suitable material capable of carrying and holding an electrostatic charge, may be used alternatively or additionally, such particles including, for example, inorganic powders, for example, a magnesium silicate (talc).

A further aspect of the invention provides a pest trap comprising an enclosure with an entrance, means arranged to lure a pest into the enclosure via the entrance, and means arranged to expose at least part of a pest lured into the enclosure to particles, preferably fine particles, carrying an electrostatic charge, again preferably of opposite polarity to that of the pest.

Methods and traps in accordance with the present invention are cheap. Pollution problems arising from the use of toxic chemicals are eliminated or greatly reduced. Expensive high voltage devices and their associated noises and smells of burning insects are avoided. There are few constraints on the external design of the trap, which can be made aesthetically pleasing. The trap may be disposable and the trapping zone may comprise a disposable retaining device. When used with insecticides, the method of the present invention provides an efficient way to kill insects by ensuring that the insecticide reaches the insect more effectively and remains in place for longer periods.

Various embodiments of the present invention will now be described by way of example with reference to the accompanying drawings in which.

Figure 1A:
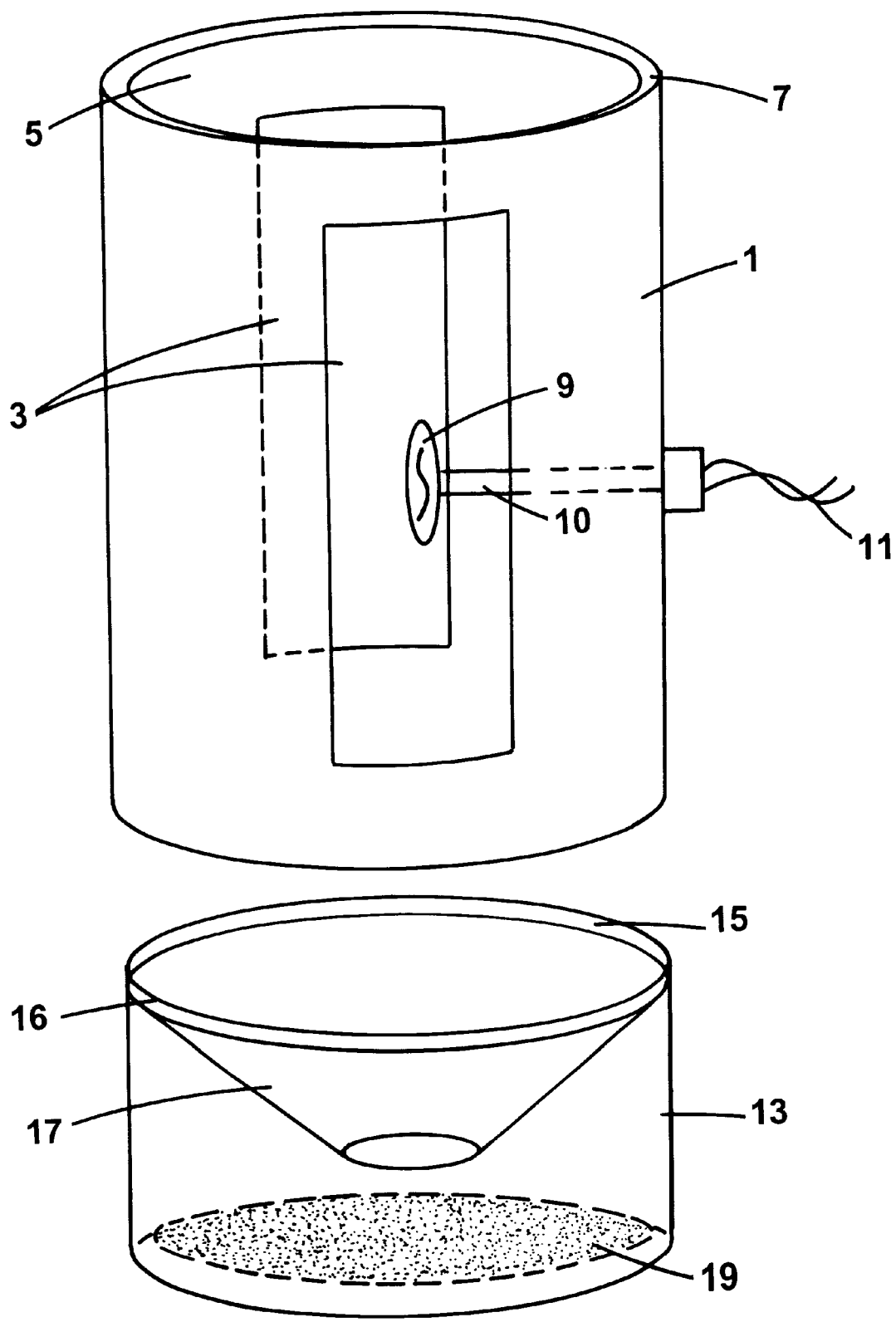
FIGS. 1A and 1B show one embodiment of trap according to the present invention for use in the method of the invention to trap flying insects.

Referring to FIG. 1A, a first embodiment of flying insect trap comprises an enclosure in the form of a cylinder 1 with two longitudinal slots 3. The open top 5 of the cylinder 1 has an inwardly projecting flange 7 around its rim. A light source 9, which acts as an insect attractant, is mounted in the centre of the cylinder by a support 10 and powered by an external electrical power source 11, which may be mains or a battery. The inside surface of the cylinder is reflective. The cylinder 1 fits on to a base 13 which is of the same diameter as the cylinder and is retained by a screw thread 15 or by a push fit. A funnel 17, which has a non-stick surface of, for example, Teflon (Registered Trade Mark), projects downwardly from the upper rim 16 of the base towards the floor thereof. The floor of the base is sticky or has a sticky insert 19.

Figure 1B:
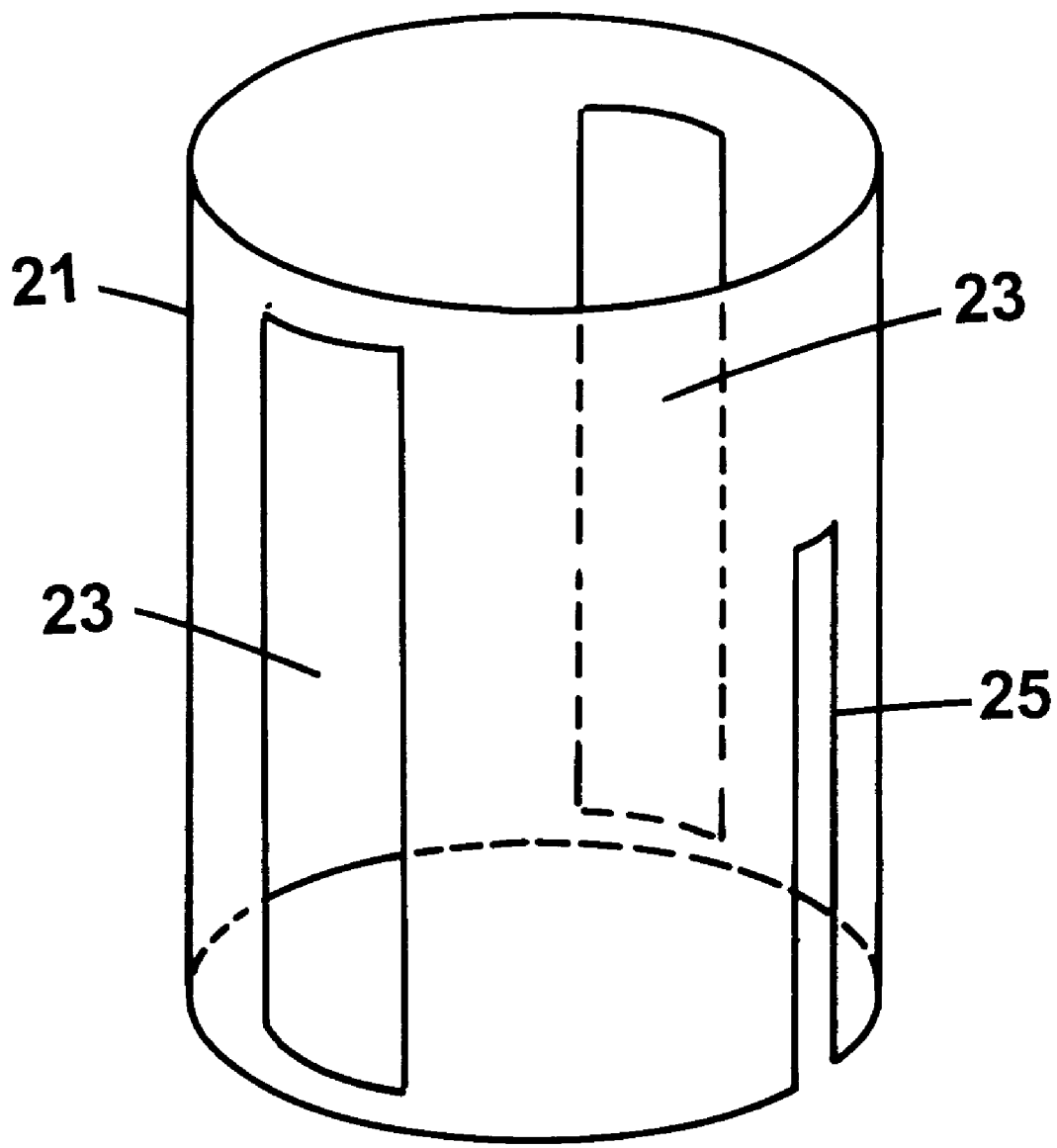

A replaceable cylindrical insert 21, as shown in FIG. 1B, fits inside the main cylinder 1 and is made of a stiff transparent plastics material. It is coated on its inside surface with particles using electrostatic methods and has two slots 23, which coincide with those of the main cylinder 1, and a further slot 25 to accommodate the light source support 10.

The trap shown in FIGS. 1A and 1B is especially suitable for catching flying insects, such as, houseflies or wasps. The insect enters the trap through an entrance, such as, the open top 5 of the cylinder 1 or one of the slots 3, attracted by the light 9. Inside the cylinder 1, the reflected light causes the insect to alight on the inside surface of the cylindrical insert 21. As it attempts to walk, it accumulates particles on its feet, which cause it to slip. The particles may stimulate grooming and are thoroughly spread to other parts of the body, including the sense organs. This assists in reducing the stability of the insect. Eventually the insect is destabilised and unable to keep its purchase, falling through the funnel on to the sticky insert 19. Alternatively, the insect may attempt to land on entering the trap and, failing to do so, gradually slips to the bottom of the trap.

Additionally, the particles may include an insecticide, in which case, an insect which has been contaminated with the particles and which is still capable of flying, may fly from the trap, which could be suitably modified for this purpose, and then return to locations where it will contaminate further insects of its kind with the insecticide associated with the particles.

The sticky insert 19 may be removed when a large number of insects has accumulated on it and be replaced with a new one. Similarly, the cylindrical insert 21 will eventually lose most of its particulate coating and may be replaced.

It is to be understood that although the articles are not shown on the inside surface of the cylindrical insert 21, they are, nevertheless, present thereon.

Figure 2:
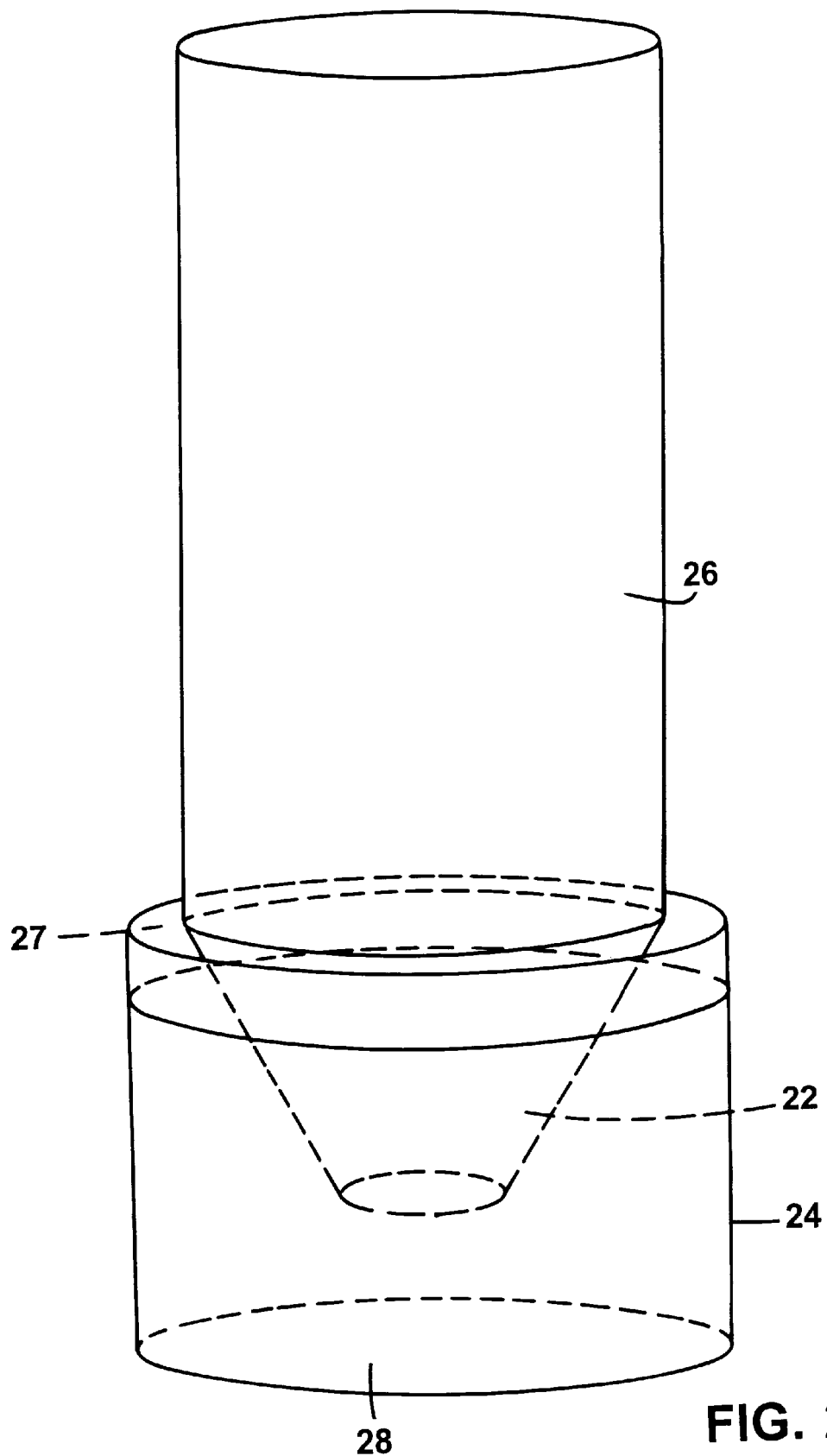
FIG. 2 shows a second embodiment of trap according to the present invention, for use in a method of the invention, also for trapping flying insects.

Referring now to FIG. 2, a trap for trapping flying insects comprises an open-topped cylinder 26, with a funnel-shaped base 22 fitted into the top 27 of a retaining container 24 whose base 28 is provided with a sticky material (not shown) for retaining insects thereon. Alternatively, the base 28 may have a removable sticky insert (not shown) or contain a desiccant or abrasive material, which interferes with the waterproofing of the insect cuticle or some form of insecticide, preferably chemical.

A flying insect is attracted into the trap by a lure, such as a light source (not shown), or a volatile chemical attractant. It enters through the open top of the cylinder 26 and as it attempts to land on the inner surface thereof, it encounters a thin coating of electrostatically-charged particles on that surface. The particles stick to the insect's feet, so that it cannot land and/or stand securely on the inner surface of the cylinder 26. As a result, it either falls or progresses downwardly while making successive but unsuccessful attempts to land and/or stand securely on that surface. Alternatively, the insect may be able to effect an initial landing but subsequent attempts to do so also fail, owing to the electrostatically charged particles attached to the insect's feet.

The insect falls through the funnel-shaped base 22, whose inside surface is also coated with electrostatically charged particles, in to the retaining container 24.

Again, although the particles are not actually shown on the inside surface of the cylinder 26 and the funnel-shaped base 22, they are, in fact, present thereon.

Figure 3A:
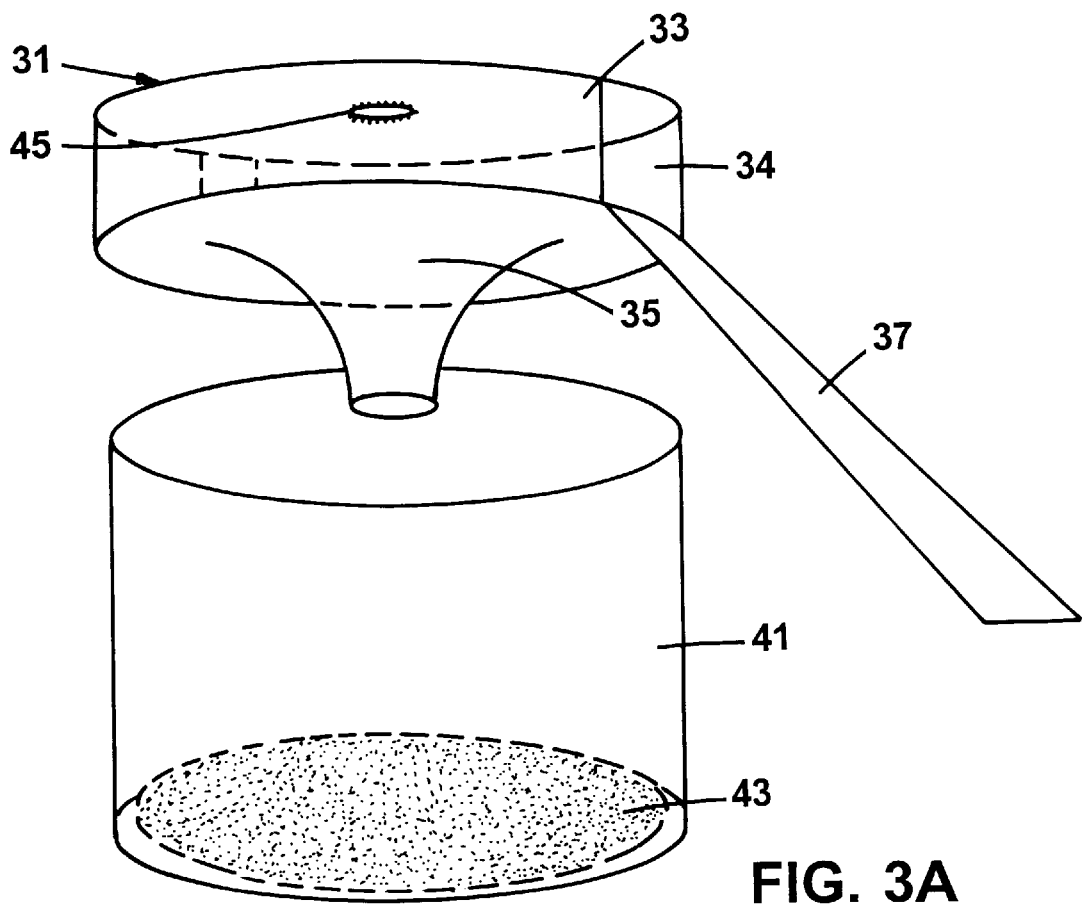
FIGS. 3A and 3B show a third embodiment of trap according to the present invention for use in a method of the invention to trap crawling insects.
Figure 3B:
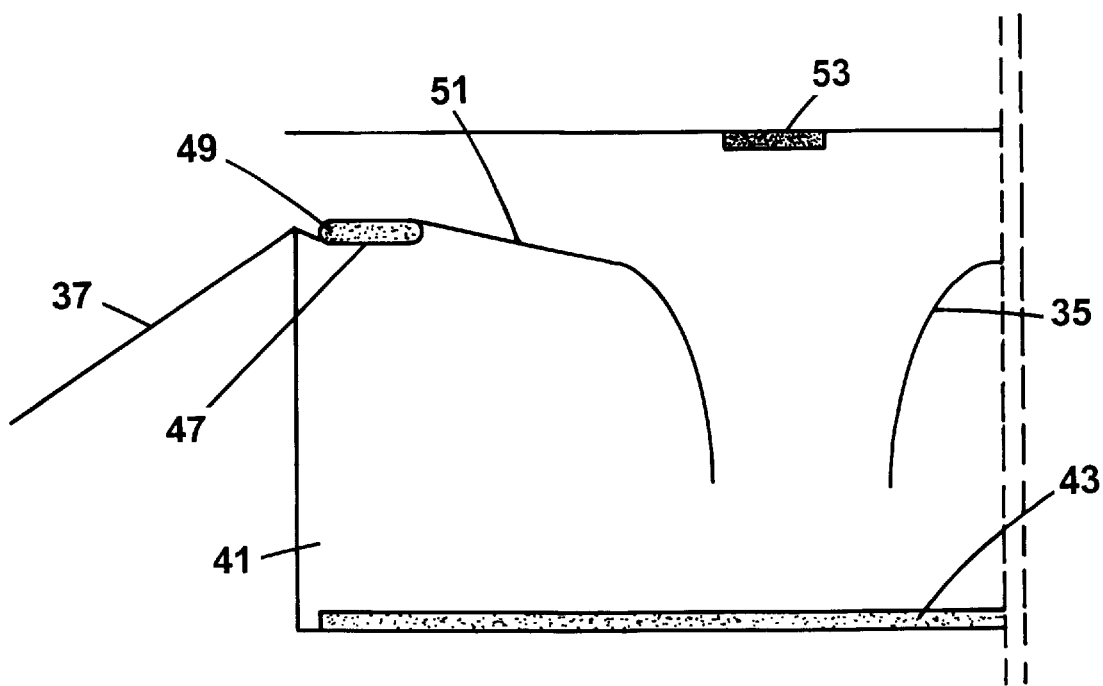

Referring to FIG. 3A, here is shown a third embodiment of insect trap but for trapping crawling insects. This embodiment comprises a funnel 31 with a circular lid 33 having two entrances in the form of openings 34. A ramp 37 on each side leads to one of the openings 34. The funnel 31 is fitted on to a trapping enclosure 41 the floor of which is covered with a sticky insert 43. The circular lid 33 of the funnel 31 has a holder 45 which receives an attractant 53. A grooved flange 47, as shown in FIG. 3B, runs around the lower rim of the funnel 31 and holds a replaceable ring 49 of felt carrying a layer of particles which have been deposited electrostatically thereon. The sloping surface 51 of the funnel is non-stick and its slope increases towards the centre of the funnel where it approximates to an exponential curve 35.

This type of trap is particularly suitable for crawling insects, such as, cockroaches. A cockroach is attracted into the trap by the odour of the attractant 53 in the lid 33 of the funnel 31. Food baits or pheromone baits may be used as the attractant. The cockroach ascends the ramp 37 and passes through the corresponding opening 34. As the cockroach explores it tends to maintain contact with the circumferential surface of the funnel 31 and crawl around the grooved flange 47. In doing so, it accumulates particles on its feet from the felt ring 49. As soon as it steps from the felt ring on to the sloping surface 51 of the funnel the cockroach loses its footing and becomes destabilised. The cockroach slips down the sloping surface 51, 35 and falls into the trapping enclosure 41 where it is held on the sticky surface 43.

Either the trapping enclosure 41 or the sticky surface 45 may be replaced when a large number of insects has been accumulated thereon. When the layer of particles on the felt ring has been depleted, the felt ring 49 may be replaced.

Once again, although the particles deposited electrostatically on the felt ring 49 are not specifically shown, they are indeed present thereon.

Figure 4:
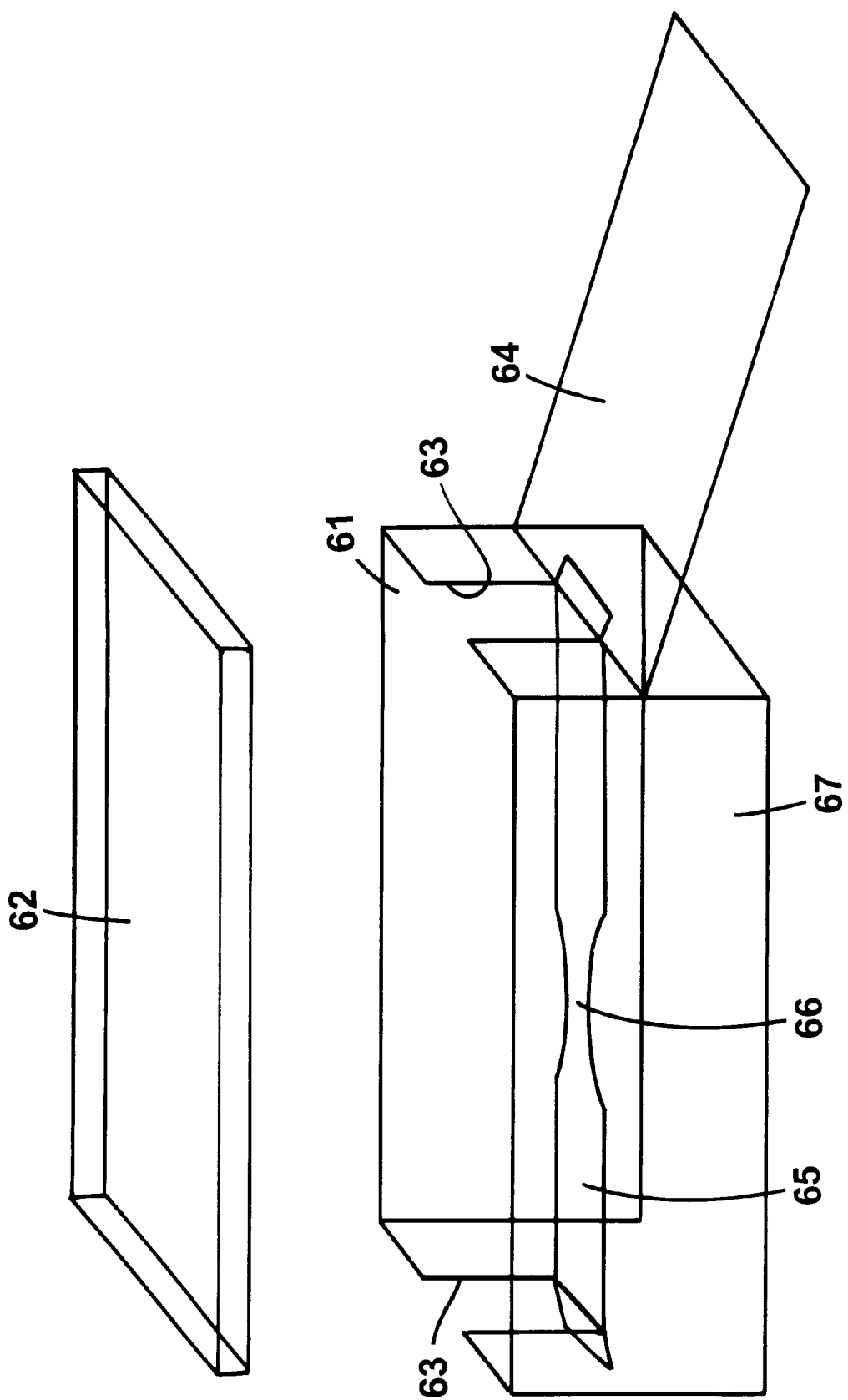
FIG. 4 shows a fourth embodiment of trap, again for trapping crawling insects.

A fourth embodiment of trap, also for trapping crawling insects, shown in FIG. 4, comprises a generally rectangular box-shaped housing 61 having a lid 62 which is detachable for the purposes of emptying and cleaning and two entry ports 63 at opposing ends thereof. An entry ramp 64 (only one shown) leads to each entry port 63. The bottom edges of the entry ports 63 are bridged by a narrow walkway 65 which is approximately 2–3 cm wide and made of a suitable material, such as, a plastics material, with a smooth surface. The edges of the walkway 65 slope downwardly giving it a shallow inverted U-shape in cross-section. Near its centre, there is a constriction 66. The walkway 65 is coated along all or most of its upper surface with electrostatically charged particles in the form of a powder. The floor 67 of the housing 61 contains a sticky material, an insert with a sticky surface, a desiccant, abrasive or chemical insecticide, so that any insects coming into contract therewith, can be retained or immobilised. Yet again, although the electrostatically charged powder is not shown on the upper surface of the walkway 65, it is, nevertheless, present thereon.

An insect is attracted up one of the entry ramps 64 to the associated entry port 63 by an attractant, such as, a volatile chemical attractant, for example, a pheromone or a food attractant placed inside the housing 61. As the insect then walks on the central walkway 65, it accumulates the electrostatically-charged powder on the undersurface of its feet. As it attempts to turn or deviate from a central track it steps on to the downwardly sloping edge of the walkway 65 and slips therefrom, falling to the floor 67 of the housing 61. If, however, the insect continues on a central track along the walkway 65, it encounters the constriction 66 which forces it to turn to the left or right, thereby causing it to fall. On falling, it may be trapped on a sticky surface associated with the floor 67. Alternatively, it may be unable to climb the sides of the housing 61 because of the powder on its feet or because the interior walls of the housing 61 are coated with electrostatically-charged particles, thus dying from desiccation, contact with chemical insecticides or exhaustion, as the case may be.

In a modified form of this fourth embodiment of trap, the interior surfaces may be coated by shaking the housing 61 to charge a suitable powder which has previously been placed in it. The power will then coat all the internal surfaces of the trap which have sufficient insulating properties.

A means of retaining insects in any of the embodiments of trap described above, may also be an oily layer, which immobilises them, or a liquid into which they fall.

A light source with some emission in the ultraviolet range is a suitable attractant for traps for flying insects, whilst chemical stimuli may be used in any type of trap. Such a suitable stimulus is a synthetic pheromone attractant.

A trap placed near a light in a room will catch insects drawn to the light. Such a trap may comprise a shade for the light having a window of transparent material carrying a surface layer of charged particles and beneath which is a retaining surface in the form of a trough. Insects drawn to the light hit the window, acquire a coating of particles and drop into the trough. Alternatively, a transparent coated sheet, carrying charged particles on one face, may be placed on the inside of a window, with a retaining surface beneath the sheet to catch insects drawn to the window.

Additionally, the particles may include an insecticide, in which case, any insect contaminated with the particles and still capable of crawling, may exit the trap and return to a location where it will contaminate other insects of its kind with the insecticide.

A modification for the embodiments of trap described above in relation to the drawings, involves the omission of at least the trapping zone 13 and 19, 24 and 25, 41 and 43, 67, so that flying or crawling insects contaminated with the particles including an insecticide or other chemical, will return to contaminate other insects with the insecticide. This is applicable especially but not exclusively to so-called "social insects", such as, bees, wasps, ants and termites.

It is to be appreciated that the inventive trap may be designed for appropriate target insect pests, for example, cockroaches, houseflies and blowflies, mosquitoes, wasps and ants.

These designs will differ to take into account the behaviour of the particular insect pest, the type of attractant which is most efficient and the nature of its use, namely, domestic, agricultural or otherwise.

Also, certain powders may be used, which adhere to the insect cuticle and which retain their electrostatic charge for long periods. Retention of charge by powders for long periods has been observed.

Contamination methods may be particularly suitable for control of pests such as aphids, dipteran disease vectors, fruit flies, locusts, social insects and fleas.

As indicated above, charged powders can be applied to plant surfaces, such as, leaves, but adhere better to insects walking over them. Aphids become rapidly contaminated either by walking over a coated surface or by having powder blown over them, tending to immobilise them and causing them to die within 24 to 48 hours. The powder may be formulated with insecticide. For example, it has been shown that spores of pathogenic fungi will adhere to the surface of fine wax particles, probably electrostatically, whilst the viability of the spores appears unaffected, and that such particles will transfer and adhere to pests.

Diptera are easily contaminated with electrostatically charged powder and a system of trapping-contamination-release is envisaged, whereby the insects would attract a small dose of powder carrying an entomopathogen, or insect growth regulator or other insecticide. This would persist on the cuticle and be transferred during mating to the insects.

A similar technique could be developed for tephritid fruit flies, medfly, olive fly and the like.

The electrostatically charged powders have been found not to adhere well to keratin. However, in combination with an insecticide they could provide selectively adhesive flea powders.

It is to be appreciated further that the inventive traps can be produced extremely cheaply, are highly efficient and need include no pesticides or hazards to health and safety. In particular, insect destabilisation and knockdown is achieved without electrical grids or toxic chemicals. There are very few constraints on size, shape or materials from which the traps can be constructed. Hence, cheaply-produced "throw-away" traps can be designed for the mass market. Alternatively, permanent traps, for example, made of a ceramic material, can be designed which are aesthetically pleasing to have in the home. Otherwise, industrial size traps can be designed for agricultural or similar applications.

The main active components of the inventive traps are the electrostatically charged particles and, optionally, chemical, visual or other lures. Broad-spectrum chemicals of natural origin, including semiochemicals, can be used as attractants.

Throughout this specification the word "pest" has been used to include, inter alia, various types of fungi.

I claim:

1. A pest trap comprising an enclosure with an entrance, means arranged to lure a pest into said enclosure via said entrance, a surface inside the enclosure coated with particles carrying an electrostatic charge which is of opposite polarity to that of the pest, and a trapping zone located below said surface, whereby a pest which lands on said surface becomes at least partially coated with the charged particles so that it becomes destabilised and falls into the trapping zone.

2. The pest trap of claim 1 wherein said particles comprise a wax.

3. The pest trap of claim 2 wherein said wax is preferably a plant wax and most preferably Carnauba wax.

4. The pest trap of claim 1 wherein said particles comprise an inorganic material.

5. The pest trap of claim 4 wherein said inorganic material comprises magnesium silicate.

6. The pest trap of claim 1 wherein said coated surface is inclined.

7. The pest trap of claim 6 wherein said coated surface is horizontally inclined.

8. The pest trap of claim 1 wherein said pest-luring means comprises an attractant.

9. The pest trap of claim 8 wherein the attractant is a light source or a chemical lure.

10. The pest trap of claim 9 wherein the attractant is a pheromone attractant.

11. The pest trap of claim 1 in which an insecticide is associated with the particles.

12. A method of controlling pests by trapping them which comprises providing a pest trap comprising an enclosure with an entrance and a trapping zone below said enclosure, and exposing pests to particles coated on an inner surface of the enclosure to which the pests are lured via said entrance, said particles carrying an electrostatic charge which is of opposite polarity to that of the pest, whereby a pest which lands on the surface of the enclosure becomes at least partially coated with the charged particles so it becomes destabilised and falls into the trapping zone.

13. The method of claim 12 wherein said particles comprise a wax.

14. The method of claim 13 wherein said wax is preferably a plant wax and most preferably Canauba wax.

15. The method of claim 12 wherein said particles comprise an inorganic material.

16. The method of claim 15 wherein said inorganic material comprises magnesium silicate.

17. The method of claim 12 wherein said surface to which said particles are applied is inclined.

18. The method of claim 17 wherein said surface to which said particles are applied is horizontally inclined.

19. The method of claim 12 wherein the pest is lured into the enclosure by means of a light source or a chemical lure.

20. The method of claim 19 wherein the pest-luring means is a pheromone attractant.

21. A method of controlling pests by trapping and/or killing them, which comprises exposing at least part of a pest to be trapped and/or killed to particles of a frictionally charged material coated on an inner surface of an enclosure to which the pest is lured, said particles carrying an electrostatic charge which is of opposite polarity to that of the surface of said pest, said particles being associated with an effective amount of a member selected from the group consisting of a pesticide, a chemical having a sub-lethal effect and a behaviour-modifying chemical, whereby a pest which lands on the surface of said enclosure becomes at least partially coated with the charged particles so that becomes destabilised and falls into a trapping zone positioned below said enclosure.

22. The method of claim 21 wherein said particles are associated with a pesticide comprising an insecticide.

23. The method of claim 21 wherein said particles are associated with a chemical having a sub-lethal effect selected from the group consisting of monoterpene, sesquiterpene and combinations thereof.

* * * * *

UNITED STATES PATENT AND TRADEMARK OFFICE
CERTIFICATE OF CORRECTION

PATENT NO.    : 6,041,543
DATED         : March 28, 2000
INVENTOR(S)   : Philip Edwin Howse It is certified that error appears in the above-identified patent and that said Letters Patent is hereby corrected as shown below:

<u>Title page,</u>
Item [87], "PCT Pub. Date", delete "1995" and insert -- 1994 --.

Signed and Sealed this

Tenth Day of September, 2002

Attest:

JAMES E. ROGAN
Attesting Officer    *Director of the United States Patent and Trademark Office*